United States Patent
Matsumoto et al.

(10) Patent No.: US 7,238,438 B2
(45) Date of Patent: *Jul. 3, 2007

(54) POWDER FOR UNDERLAYER OF COATING-TYPE MAGNETIC RECORDING MEDIUM

(75) Inventors: Kazuyuki Matsumoto, Okayama (JP); Kenichi Inoue, Okayama (JP); Ken Inoue, Okayama (JP)

(73) Assignee: Dowa Mining Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/508,033

(22) PCT Filed: Apr. 2, 2003

(86) PCT No.: PCT/JP03/04214

§ 371 (c)(1),
(2), (4) Date: Sep. 16, 2004

(87) PCT Pub. No.: WO03/088218

PCT Pub. Date: Oct. 23, 2003

(65) Prior Publication Data

US 2005/0129945 A1 Jun. 16, 2005

(30) Foreign Application Priority Data

Apr. 3, 2002 (JP) ............... 2002-101444

(51) Int. Cl.
*G11B 5/733* (2006.01)
*B32B 5/16* (2006.01)

(52) U.S. Cl. .................. 428/840.2; 428/402
(58) Field of Classification Search .......... 428/402, 428/840.2
See application file for complete search history.

(56) References Cited

U.S. PATENT DOCUMENTS

| | | | | |
|---|---|---|---|---|
| 5,183,709 | A | * | 2/1993 | Schwab et al. ............. 428/404 |
| 5,314,750 | A | * | 5/1994 | Takedoi et al. ............. 428/402 |
| 5,576,075 | A | * | 11/1996 | Kawasaki et al. ........... 427/565 |
| 5,902,676 | A | * | 5/1999 | Hisano et al. ............ 428/840.2 |
| 6,440,545 | B1 | | 8/2002 | Hisano et al. |
| 6,475,598 | B1 | * | 11/2002 | Naoe et al. ................ 428/141 |
| 6,534,168 | B2 | * | 3/2003 | Naoe et al. ................ 428/329 |
| 2002/0119346 | A1 | * | 8/2002 | Naoe et al. ............ 428/694 BS |
| 2005/0158586 | A1 | * | 7/2005 | Matsumoto et al. .. 428/694 BA |

FOREIGN PATENT DOCUMENTS

| | | |
|---|---|---|
| JP | 63-187418 | 8/1988 |
| JP | 4-167225 | 6/1992 |
| JP | 6-60362 | 3/1994 |
| JP | 6-139553 | 5/1994 |

(Continued)

*Primary Examiner*—H. Thi Le
(74) *Attorney, Agent, or Firm*—Clark & Brody (57) ABSTRACT

A powder for an underlayer of a coating-type magnetic recording medium, which powder comprises flat-acicular iron oxide particles having an average major axis length of 20–200 nm, a short axis cross-section taken perpendicularly to the long axis that has a long width and a short width, and a short axis cross-section ratio defined as the ratio of the long width to the short width that is greater than 1.3 and substantially uniform in the long axis direction, the powder having a specific surface area measured by the BET method of 30–100 m$^2$/g. The underlayer powder preferably contains 0.1–5.0 wt % of P and, optionally, an amount of R(R representing one or more rare earth elements, defined as including Y) such that R/Fe expressed in atomic percentage (at. %) is 0.1–10 at. %.

5 Claims, 2 Drawing Sheets

FOREIGN PATENT DOCUMENTS

| | | |
|---|---|---|
| JP | 6-215360 | 8/1994 |
| JP | 7-192248 | 7/1995 |
| JP | 9-22524 | 1/1997 |
| JP | 9-170003 | 6/1997 |
| JP | 9-255341 | 9/1997 |
| JP | 10-53421 | 2/1998 |
| JP | 10-340447 | 12/1998 |
| JP | 11-273056 | 10/1999 |
| JP | 2000-143250 | 5/2000 |
| JP | 00/38181 | 6/2000 |
| JP | 2001-176058 | 6/2001 |
| JP | 2001-243619 | 9/2001 |
| JP | 2001-297428 | 10/2001 |
| JP | 2001-344738 | 12/2001 |
| JP | 2002-74646 | 3/2002 |

\* cited by examiner

TEM specimen angle −60 degrees

Short axis width 18.5nm

TEM specimen angle +30 degrees

Short axis width 35.2nm

Short axis cross-section ratio = 35.2／18.5 = 1.9

US 7,238,438 B2

POWDER FOR UNDERLAYER OF COATING-TYPE MAGNETIC RECORDING MEDIUM

TECHNICAL FIELD OF THE INVENTION

This invention relates to a powder for an underlayer of a multi-layer structure coating-type magnetic recording medium and a magnetic recording medium using the same.

BACKGROUND ART

Known coating-type magnetic recording media (magnetic tapes including video tapes and the like) include multi-layer structure types consisting of a magnetic layer composed of magnetic powder dispersed in resin, a base film, and a nonmagnetic layer composed of nonmagnetic powder dispersed in a resin that is located between the magnetic layer and the base film as an underlayer. Use of such a multi-layer structure improves the electromagnetic conversion characteristics of the magnetic recording medium to enable high recording density. The reliability of the tape is also enhanced owing to improved durability. In this specification, the terms "powder for underlayer" and "underlayer powder" are used to mean a powder for forming the nonmagnetic layer (underlayer) of such a multi-layer structure coating-type magnetic recording medium.

The incessant rise in information volume in recent times has increased the need for recording media with higher recording capacity and reliability. This in turn has produced a need to improve the different properties of the underlayer powder used to fabricate multi-layer structure coating-type magnetic recording media. The basic properties required of an underlayer powder include ability to form an underlayer with high surface smoothness when applied to the base film and the ability to produce an underlayer composed of a film coating having high strength.

An underlayer having a smooth surface enhances the smoothness of the overlaid magnetic layer, making it possible to obtain a magnetic recording medium having excellent electromagnetic conversion characteristics that enable high recording density. Strength enhancement of the underlayer is desirable because the thinner tape thicknesses necessitated by rising tape capacity makes it important to achieve high recording density and for this to ensure dimensional stability. A stronger underlayer helps to upgrade reliability by boosting the strength of the tape proper.

In order to satisfy these requirements, an underlayer nonmagnetic powder generally must have excellent dispersibility at the paint-making stage, high particle strength, and high adherence to the resin. When a coating film is applied using a nonmagnetic powder with these properties, a smooth, high-strength underlayer can be formed.

The main nonmagnetic powders conventionally used for underlayer formation are spherical titanium oxide powder and acicular iron oxide powder. Multi-layer structure magnetic recording media having an underlayer are taught by, for example, JP Sho-63-187418A and Hei-4-167225A.

In addition, Hei-6-60362A, Hei-6-139553A, Hei-6-215360A, Hei-7-192248A and Hei-9-170003A, for example, indicate characteristic values when acicular ion oxide and the like are used as nonmagnetic powder for underlayer formation in such multi-layer structure magnetic recording media.

PROBLEMS THE INVENTION INTENDS TO SOLVE

A tape made using spherical titanium oxide as the powder for underlayer formation is low in strength compared to that in the case of using an acicular powder. In contrast, an acicular iron oxide powder offers advantages attributable with its acicularity, such as that when a coating film containing dispersed particles of the powder is formed, film smoothness can be enhanced by reducing the number of particles oriented vertically and that interaction among the acicular particles (entanglement) works to increase the strength of the coated film. However, acicular iron oxide requires a high-temperature firing process in the course of production and is therefore susceptible to inter-particle sintering and loss of acicularity. Owing to this, currently available acicular iron oxide powders are not adequate as underlayer powders capable of responding to demands for better tape characteristics (surface smoothness and coated film strength).

An object of the present invention is therefore to overcome the aforesaid problems by providing a powder for an underlayer of a multi-layer structure coating-type magnetic recording medium endowed with the required properties, particularly an underlayer iron oxide powder that improves tape surface smoothness and coated film strength. Another object of the present invention is to provide a multi-layer structure magnetic recording medium offering large recording capacity and high reliability.

SUMMARY OF THE INVENTION

The present invention provides a powder for an underlayer of a coating-type magnetic recording medium, which powder comprises flat-acicular iron oxide particles having an average major axis length of 20–200 nm, a short axis cross-section taken perpendicularly to the long axis that has a long width and a short width, and a short axis cross-section ratio defined as the ratio of the long width to the short width that is greater than 1.3 and substantially uniform in the long axis direction, the powder having a specific surface area measured by the BET method of 30–100 $m^2/g$. The underlayer powder according to the present invention preferably has a powder pH of not greater than 7. In addition, the underlayer powder according to the present invention contains 0.1–5.0 wt % of P and optionally contains an amount of R (where R represents one or more rare earth elements, defined as including Y) such that R/Fe expressed in atomic percentage (at. %) is 0.1–10 at. %. Use of this underlayer powder enables production of a highly durable magnetic recording medium excellent in surface smoothness that is suitable for high-density recording.

DESCRIPTION OF THE PREFERRED EMBODIMENTS

The present invention is characterized in the point that it provides and uses an underlayer powder for forming a nonmagnetic layer of a multi-layer structure coating-type magnetic recording medium, which comprises "flat-acicular iron oxide particles" having an average major axis length of 20–200 nm, has a specific surface area measured by the BET (Brunauer-Emmitt-Teller) method of 30–100 m$^2$/g and preferably has a powder pH of not greater than 7. This flat-acicular underlayer powder is produced from flat-acicular iron oxy-hydroxide as a precursor. It is obtained by firing the precursor, preferably after the precursor has been surface treated with a phosphorus compound, or a phosphorus compound and at least one rare earth metal compound. Since conventional acicular iron oxide is, at the time of application, inadequate in dispersibility and also in particle alignment and particle interaction (entanglement), the resulting tape is insufficient in both surface smoothness and coated film strength. The inventors discovered, however, that markedly enhanced tape surface smoothness and improved coated film strength can be achieved by changing the shape of the iron oxide particles from acicular to flat-acicular and restraining sintering among the particles. The present invention was accomplished based on this discovery.

As termed with respect to the present invention, "flat-acicular" is used to describe the shape of a flat needle having a ratio of long direction length (major axis length) to maximum short direction length perpendicular thereto (minor axis length), i.e., long axis/short axis ratio or axial ratio, preferably of not less than 2, a short axis cross-section taken perpendicularly to the long axis that has a long width and a short width, and a short axis cross-section ratio defined as the ratio of the long width to the short width that is greater than 1.3, preferably not less than 1.4, more preferably not less than 1.5 and is substantially uniform in the long axis direction.

Figure 1:
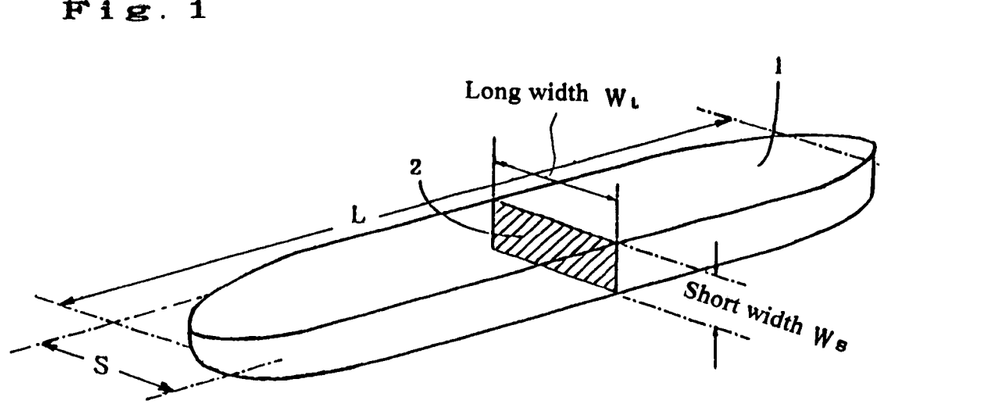
FIG. 1 is a conceptual view for explaining the shape of a flat-acicular particle of the present invention.
Figure 2:
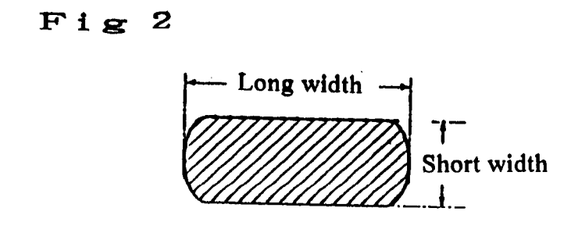
FIG. 2 is a diagram showing another shape of the short axis cross-section of a flat-acicular particle of the present invention.
Figure 3:
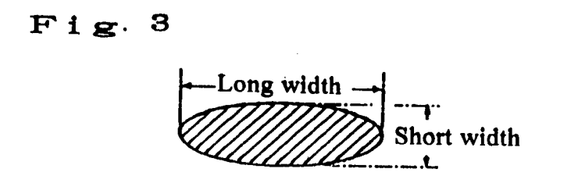
FIG. 3 is a diagram showing another shape of the short axis cross-section of a flat-acicular particle of the present invention.
Figure 4:
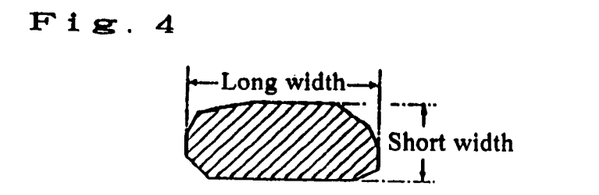
FIG. 4 is a diagram showing another shape of the short axis cross-section of a flat-acicular particle of the present invention.
Figure 5:
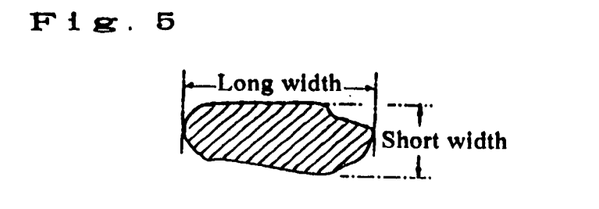
FIG. 5 is a diagram showing another shape of the short axis cross-section of a flat-acicular particle of the present invention.

FIG. 1 is illustrates the flat-acicular shape diagrammatically. As illustrated, an acicular body 1 having a maximum length L in the long direction (major axis length) and a maximum length S in the short direction lying perpendicular thereto (short minor axis length) has a short axis cross-section 2 taken perpendicularly to the long axis that has a long width $W_L$ and a short width $W_S$. For example, it has a shape resembling a flat plate of width $W_L$ and thickness $W_S$. The flat shape of the short axis cross-section 2 is, however, not limited to rectangular but may be capsule-like as shown in FIG. 2, elliptical as shown in FIG. 3, polygonal as shown in FIG. 4, deformed circular as shown in FIG. 5 or any of various other shapes. What is important is for the ratio $W_L/W_S$ (called "short axis cross-section ratio" in this specification) to be greater than 1.3, preferably not less than 1.4, more preferably not less than 1.5 and substantially uniform in the long axis direction (by substantially uniform is meant not twisted). The flat-acicular iron oxide particles of this invention have almost no branching.

The short axis cross-section ratio of the flat-acicular particles can be determined by taking multiple electron micrographs of the same portion of a specimen while progressively tilting the specimen stage, measuring the maximum short width and maximum long width at each tilt angle, and calculating the short axis cross-section ratio from the tilt angle and the measured values. The average of the values determined for 100 particles is defined as the short axis cross-section ratio of the powder.

The flat-acicular iron oxide powder according to the present invention can be obtained by producing and then appropriately firing a flat-acicular iron oxy-hydroxide powder. A method of producing the flat-acicular iron oxy-hydroxide powder will be explained first.

Method of Producing Flat-acicular Iron Oxy-hydroxide

The method adopted for obtaining iron oxide powder for forming an underlayer is to fire acicular iron oxy-hydroxide. Typical methods ordinarily used to obtain the iron oxy-hydroxide for this purpose include:

(1) Method of passing an oxygen-containing gas at a temperature not higher than 80° C. through a suspension including a ferrous iron hydroxide colloid obtained by adding an equivalent or more of an alkali hydroxide aqueous solution to a ferrous salt aqueous solution to conduct an oxidizing reaction at a pH of 11 or higher, thereby producing iron oxy-hydroxide.

(2) Method of passing an oxygen-containing gas through a suspension obtained by reacting a ferrous salt aqueous solution and an alkali carbonate aqueous solution to conduct an oxidizing reaction and thereby produce iron oxy-hydroxide.

However, these methods generally produce iron oxy-hydroxide obtained that has a small short axis cross-section ratio and are not readily capable of stably producing particles having a short axis cross-section ratio such as aimed at by the present invention. Still, method (1) can produce iron oxy-hydroxide particles with a short axis cross-section ratio exceeding 1.3 under appropriately adjusted conditions.

The following method is preferably used for obtaining iron oxy-hydroxide with a large short axis cross-section ratio:

(3) Method of adding to a ferric salt aqueous solution 1.0–3.5 equivalents based on iron of an alkali hydroxide aqueous solution to produce a suspension containing the obtained ferric hydroxide colloid at 10–90° C., and hydrolyzing the suspension after it has ripened for 2–20 hours to produce an iron oxy-hydroxide powder.

As taught by the present assignee's Japanese Patent Publication No. Hei-10-340447A, method (3) enables stable production of iron oxy-hydroxide having a short axis cross-section ratio of greater than 1.3, preferably 1.4 or greater and in some cases 1.5 or greater. By appropriately firing this flat-acicular iron oxy-hydroxide, there can be obtained a powder of flat-acicular iron oxide particles (hematite). "Appropriate firing" means firing that does not cause sintering in the course of the firing process. This can be achieved by coating the flat-acicular iron oxy-hydroxide with a phosphorus compound or with a phosphorus compound and at least one rare earth element (defined as including Y) compound.

Sinter Preventing Treatment When Firing Flat-acicular Iron Oxy-hydroxide

Production of iron oxide by firing iron oxy-hydroxide usually causes inter-particle sintering and deformation of particle shape. A conventional method used to mitigate this problem is that of incorporating a sinter preventing agent, typically Al or Si, into the iron oxy-hydroxide particle interiors or coating their surfaces with such a sinter preventing agent. However, the effect of this method was found to fall short of what is required to obtain flat-acicular iron oxide from flat-acicular iron oxy-hydroxide.

The method adopted by the present invention is to coat the particles of the flat-acicular iron oxy-hydroxide with a phosphorus compound or with a phosphorus compound and a rare earth element (defined as including Y) compound. The slurry containing dispersed/suspended iron oxy-hydroxide obtained after the hydrolysis reaction when the aforesaid method (3) is implemented to coat the flat-acicular iron oxy-hydroxide or the slurry containing dispersed/suspended iron oxy-hydroxide obtained upon completion of the oxidation reaction when the aforesaid method (1) is used for this purpose is preferably put into a vigorously stirred state, added with a phosphorus-containing aqueous solution of prescribed concentration, and subjected to further stirring for a specified time period. Upon completion of these steps, a prescribed amount of at least one rare earth element, which may be Y, dissolved in sulfuric acid can be added. In this case, the uniformity of the coating is preferably promoted by vigorous stirring and prolonging the stirring time following the addition.

Another method that can be employed is to add iron oxy-hydroxide prepared beforehand to pure water, stir the mixture, and then subject the suspension obtained to coating treatment in the aforesaid manner. In this case, coating with a rare earth element compound may sometimes be impossible because no hydroxide forms owing to the fact that the suspension is near neutral. This problem can be overcome by adding an appropriate alkali to the suspension to make the suspension alkaline.

The obtained iron oxy-hydroxide coated with the phosphorus compound and optionally the at least one rare earth element compound is filtered from the suspension and washed with water. The washing should be carried out thoroughly until the filtrate is nearly neutral. This is because unadhered phosphorus compound tends to be co-present owing to the limited amount of phosphorus compound that can adhere, and if this unadhered phosphorus compound is not thoroughly removed, the surface smoothness after tape fabrication may be degraded.

Usable phosphorus compounds include phosphoric acid, metaphosphoric acid, diphosphoric acid, and phosphates such as ammonium phosphate and ammonium dihydrogen phosphate. Irrespective of the type of phosphorus compound used, the amount of phosphorus coating is preferably in the range of 0.1–5.0 wt % as the content of phosphorus atoms in the iron oxide. When the amount is less than 0.1 wt %, the sinter preventing effect by the phosphorus coating is insufficient for obtaining an underlayer excellent in surface smoothness and for obtaining adequate coated film strength. On the other hand, an amount of phosphorus in excess of 5.0 wt % provides sufficient sinter preventing effect but the iron oxide powder comes to have a high specific surface area. Such an iron oxide powder is unsuitable as an underlayer powder because it cannot be thoroughly dispersed during paint preparation. In addition, free phosphorus compound that comes to be present at the time of coated film formation is incorporated into the coated film structure and has an adverse effect on the coated film. This is preferably avoided.

Usable rare earth elements are not particularly limited, i.e., the effect of the invention is observed regardless of which element(s) is/are used. However, Y and La are most suitable because they offer the greatest synergism with P in promoting the sinter preventing effect. The content of the rare earth element(s) in the iron oxide is preferably such that R/Fe expressed in atomic percentage (at. %) is in the range of 0.1–10 at. %. When R/Fe is lower than 0.1 at. %, the sinter preventing effect by the R coating is insufficient for obtaining an underlayer excellent in surface smoothness and for obtaining adequate coated film strength. On the other hand, when the amount of R exceeds 10 at. %, the coated iron oxy-hydroxide particles tend to flocculate. This should be avoided because it makes sintering likely to occur during the ensuing firing process.

The flat-acicular iron oxy-hydroxide surface-coated with phosphorus compound and optionally with at least one rare earth element compound in the foregoing manner is fired to obtain a flat-acicular iron oxide powder. The firing treatment is conducted in air at 300–900° C., preferably 400–700° C. A treatment time of 10–60 minutes suffices. Sintering progresses when the firing time is too long. The firing treatment has to be conducted with attention to internally retained water vapor. So as to inhibit the adverse effect of the moisture arising during the change from flat-acicular iron oxy-hydroxide to flat-acicular iron oxide, the atmosphere is preferably adjusted to reduce the water vapor density to the lowest level possible. After the prescribed treatment has been completed, the product is removed into room-temperature air and cooled to afford flat-acicular iron oxide powder. As the particles of the iron oxide powder obtained in this manner inherit the flat-acicular shape of the iron oxy-hydroxide, they also have a flat-acicular shape.

The iron oxy-hydroxide coated with a P compound and optionally at least one R compound can be sintered at a lower temperature than a conventional iron oxy-hydroxide having Al or other such sinter preventing agent dissolved into its particles. The flat-acicular shape of the iron oxy-hydroxide can therefore be easily maintained up to the point of iron oxide formation. In the past, attempts were made to upgrade sinter preventing effect by dissolving Al or the like into the particles of the iron oxy-hydroxide used as the precursor of the iron oxide. When another element is present in solid solution within the iron oxy-hydroxide particles, however, the dewatering temperature at which the iron oxy-hydroxide becomes iron oxide tends to shift to the high temperature side, so that firing has to be conducted at a higher temperature. In the case of the iron oxy-hydroxide surface-coated with a P compound and optionally with at least one R compound in accordance with the present invention, dehydration reaction proceeds from a low-temperature region. The firing temperature can therefore be set low. As a result, inter-particle sintering can be restrained and the flat-acicular shape maintained.

When another element (such as Al or Si) is co-present in the slurry during production of iron oxy-hydroxide, this other element operates as an iron oxy-hydroxide growth inhibitor and may cause production of deformed iron oxy-hydroxide particles. No such other element needs to be made co-present when flat-acicular iron oxy-hydroxide is produced in accordance with the present invention. The iron oxy-hydroxide particles therefore tend to grow two dimensionally in the long axis direction and the short axis direction, i.e., tend to grow preferentially in the X and Y directions, where the long axis direction is defined as X, the short axis directions as Y and Z. This is advantageous for obtaining particles with a high short axis cross-section ratio and by extension for obtaining flat-acicular iron oxide particles in accordance with the present invention. However, the effect of the present invention is not impaired by surface-coating the flat-acicular iron oxy-hydroxide produced in accordance with the present invention with Al or other such sinter preventing agent. Flat-acicular iron oxide powder in accordance with the present invention can therefore be obtained by firing particles of flat-acicular iron oxy-hydroxide coated with an Al compound.

Since the iron oxide powder obtained in this manner is protected against sintering, it disperses well in the resin component for forming an underlayer. Owing to the fact that the particles are flat-acicular, moreover, they overlap to readily form a broad surface during application for tape fabrication. This enables formation of a smooth underlayer and, in addition to enhancing surface smoothness, produces an effect of improving tape strength owing to the small number of particles oriented perpendicularly to the base film surface and the dense particle orientation in the direction of the tape surface. Moreover, presence of P or P and R on the surfaces of the flat-acicular iron oxide particles alters the nature of the iron oxide particle surface properties so as to enhance their dispersibility in and adherence with the resin. This also helps to improve coated film strength.

The underlayer powder composed of flat-acicular iron oxide particles of the present invention thus simultaneously improves both tape surface smoothness and tape durability. Therefore, when a very thin magnetic layer is applied onto the underlayer, it also exhibits excellent surface smoothness. This contributes to electromagnetic conversion characteristic improvement and makes it possible to obtain a magnetic tape having good strength even in a thin-layer tape. The invention underlayer powder is thus highly suitable for use in a multi-layer structure coating-type magnetic recording medium.

The underlayer powder is also advantageous in the point that the powder pH of the iron oxide powder is not greater than 7. A powder pH is one required property of the underlayer powder. A change in the powder pH of the underlayer powder affects the adsorption behavior between the powder and a fatty acid in the resin. The powder pH of the underlayer powder is therefore preferably low. A powder pH of not greater than 7 is best. More specifically, a fatty acid called a "lubricant" is usually added to the paints containing dispersed underlayer powder and magnetic powder used to manufacture the coating-type magnetic recording medium. In the state of the coated film, the lubricant operates to reduce interference between the tape surface and the head, thereby improving tape durability. A fatty acid, an acidic substance, is generally used as the lubricant. When the powder pH of the underlayer powder is on the alkaline side, therefore, a reaction tends to proceed in the paint between the underlayer powder and the acidic lubricant. When this happens, the lubricant cannot perform its intended function. The underlayer powder used is therefore preferably one having a surface property that does not give rise to adsorption with the fatty acid. In actual practice, the underlayer powder preferably has a pH of not greater than 7, more preferably a pH on the acidic side.

When the underlayer powder according to the present invention is obtained by firing iron oxy-hydroxide coated with a phosphorus compound, it has a powder pH of not greater than 7 and therefore does not degrade the action of the lubricant in the aforesaid manner. In addition, it was found to improve compatibility with the paint and, by this, to provide a further improvement in tape surface smoothness and running durability beyond that attributable to the aforesaid sinter preventing action. However, an excessively low pH should be avoided to preclude, undesirable effects on surrounding substances (e.g., the metal magnetic powder of the magnetic layer). The pH should therefore be not less than 3, preferably not less than 4. Thus the powder pH of the underlayer powder according to the present invention is preferably in the approximate range of 4–7. When the pH is in the range of 3 to 7, no corrosive effect on the metal magnetic powder in the magnetic layer is observed.

The underlayer powder composed of flat-acicular iron oxide powder according to the present invention preferable has an average major axis length (value obtained by averaging the measured major axis lengths of 100 particles randomly selected from within the field of a transmission electron micrograph) of 20–200 nm, preferably 50–160 nm, more preferably 50–120 nm. Generally speaking, the smoothness of the tape after tape production increases with decreasing average major axis length of the flat-acicular iron oxide particles insofar as the particles can be dispersed in the paint. As the underlayer powder of the present invention is composed of particles having an average major axis length within the foregoing range and a short axis cross-section ratio of greater than 1.3, it helps to improve the smoothness of the tape surface. The axial ratio of the powder particles is preferably 2–10, more preferably 3–8, most preferably 4–8. Owing to this high axial ratio and the flat-acicular shape, the particles tend to align in parallel with the base film during application. This contributes to tape surface smoothness and tape strength. The specific surface area (BET) of the invention underlayer powder is preferably 30–100 m$^2$/g, more preferably 35–80 m$^2$/g, most preferably 35–70 m$^2$/g. A specific surface area higher than 100 m$^2$/g is undesirable because the dispersion in the paint becomes poor, and one lower than 30 m$^2$/g is undesirable because the powder experiences flocculation and/or sintering.

The underlayer powder according to the present invention can also have the following powder characteristics and tape characteristics after tape fabrication, in addition to those set out above.

Stearic acid adsorption amount: 0.1–3.0 mg/m$^2$, preferably 0.1–2.0 mg/m, more preferably 0.1–1.5 mg/m$^2$. The smaller the stearic acid adsorption amount is, the smaller is the amount of lubricant (fatty acid) adsorbed during dispersion of the underlayer powder in the paint. As adverse effect on the lubricant therefore decreases with smaller stearic acid adsorption amount, the enhancement of tape durability owing to the lubricant can be maintained.

Resin adsorption amount (MR): 0.1–3 mg/m$^2$, preferably 0.5–3 mg/m$^2$, more preferably 1–3 mg/m$^2$. A high resin adsorption amount (MR) indicates good resin adherence and improves the coated film strength. A high resin adsorption amount is therefore better.

Resin adsorption amount (UR): 0.1–4 mg/m, preferably 1.0–4 mg/m$^2$, more preferably 2–4 mg/m$^2$. A high resin adsorption amount (UR) is preferable for the same reasons pointed out with regard to the resin adsorption amount (MR).

Tape surface roughness: Post calendering roughness of not greater than 200 Angstrom, preferably not greater than 150 Angstrom, and change in roughness between before and after calendering of not less than 50%. A large calendering change rate of the underlayer is preferable because the formability of the underlayer in a multi-layer structure is better and surface smoothness of the magnetic layer improves with increasing rate of change between before and after calendering.

Tape steel ball sliding Scratch width: Not greater than 190 μm, preferably not greater than 170 μm, more preferably not greater than 150 μm. A smaller scratch width indicates higher coated film strength.

Tape steel ball sliding Running durability: Not less than 600 passes, preferably not less than 900 passes, more preferably not less than 1,500 passes. Running durability is affected by both the coated film strength and the action of the lubricant in the coated film. A coated film capable of maintaining stability against as many sliding movements as possible is preferred.

When a multi-layer structure magnetic recording medium is fabricated to have an underlayer formed using a flat-acicular iron oxide powder according to the present invention, the magnetic powder constituting the upper magnetic layer, the paint composition and the base film can be exemplified as set out below.

Magnetic Powder Constituting Upper Layer:
Magnetic Powder
that is a ferromagnetic powder composed chiefly of iron containing
Co: More than 5 to 50 at. %,
Al: 0.1–50 at. %,
At least one rare earth element (defined as including Y) 0.1–30 at %,
At least one periodic table group 1a element (Li, Na, K etc.): not greater than 0.05 wt. %, and
At least one periodic table group 2a element (Mg, Ca, Sr, Ba etc.): not greater than 0.1 wt. %;
that is an acicular ferromagnetic powder of a shape having
Average major axis length: 10–200 nm,
Specific surface area (BET): 30–150 m$^2$/g, and
X-ray crystal diameter (Dx): 50–200 Angstrom; and
that has magnetic properties of
Coercive force (Hc): 1,000–3,000 Oe, and
Saturated magnetization (ss): 10–200 emu/g.

The base film for forming the multi-layer structure magnetic recording medium can be any of various resin films made of, for example, a polyester such as polyethylene terephthalate or polyethylene naphthalate, or a polyolefin such as cellulose triacetate, polycarbonate, polyamide, polyimide, polyamide-imide, polysulfone-aramid or aromatic polyamide.

Magnetic Paint for Forming Magnetic Layer (Upper Layer):
Magnetic paint composed of

| | |
|---|---|
| Metal magnetic powder | 100 parts by weight |
| Carbon black | 5 parts by weight |
| Alumina | 3 parts by weight |
| Vinyl chloride resin (MR110) | 15 parts by weight |
| Polyurethane resin (UR8200) | 15 parts by weight |
| Stearic acid | 1 part by weight |
| Acetylacetone | 1 part by weight |
| Methyl ethyl ketone | 190 parts by weight |
| Cyclohexanone | 80 parts by weight |
| Toluene | 110 parts by weight |

Nonmagnetic Paint for Forming the Nonmagnetic Layer (Underlayer):
Nonmagnetic paint composed of

| | |
|---|---|
| Flat-acicular nonmagnetic powder (a-Fe$_2$O$_3$) | 85 parts by weight |
| Carbon black | 20 parts by weight |
| Alumina | 3 parts by weight |
| Vinyl chloride resin (MR110) | 15 parts by weight |
| Polyurethane resin (UR8200) | 15 parts by weight |
| Methyl ethyl ketone | 190 parts by weight |
| Cyclohexanone | 80 parts by weight |
| Toluene | 110 parts by weight |

Each paint is prepared by blending the materials in ratios to obtain the aforesaid composition and then kneaded/dispersed using a kneader and a sand grinder to obtain a coating liquid. The obtained paint is applied onto the base film to the desired thickness. The magnetic layer is oriented while still damp by exposure to a magnetic field, whereafter drying and calendering are conducted to obtain a magnetic tape. By using a ferromagnetic powder, base film and paint composition as exemplified above and forming a nonmagnetic layer using the flat-acicular underlayer powder according to the present invention, it is possible to manufacture a magnetic recording medium suitable for high-density recording that offers a level of performance not found in conventional counterparts.

EXAMPLES

Typical examples of the present invention will now be explained. First, however, an explanation will be made regarding determination of the characteristic values in the examples.

Average major axis length, average short minor axis length, and axial ratio: Values obtained by averaging the measured values of 100 particles randomly selected from a transmission electron micrograph of 174,000 magnifications.

Figure 6:
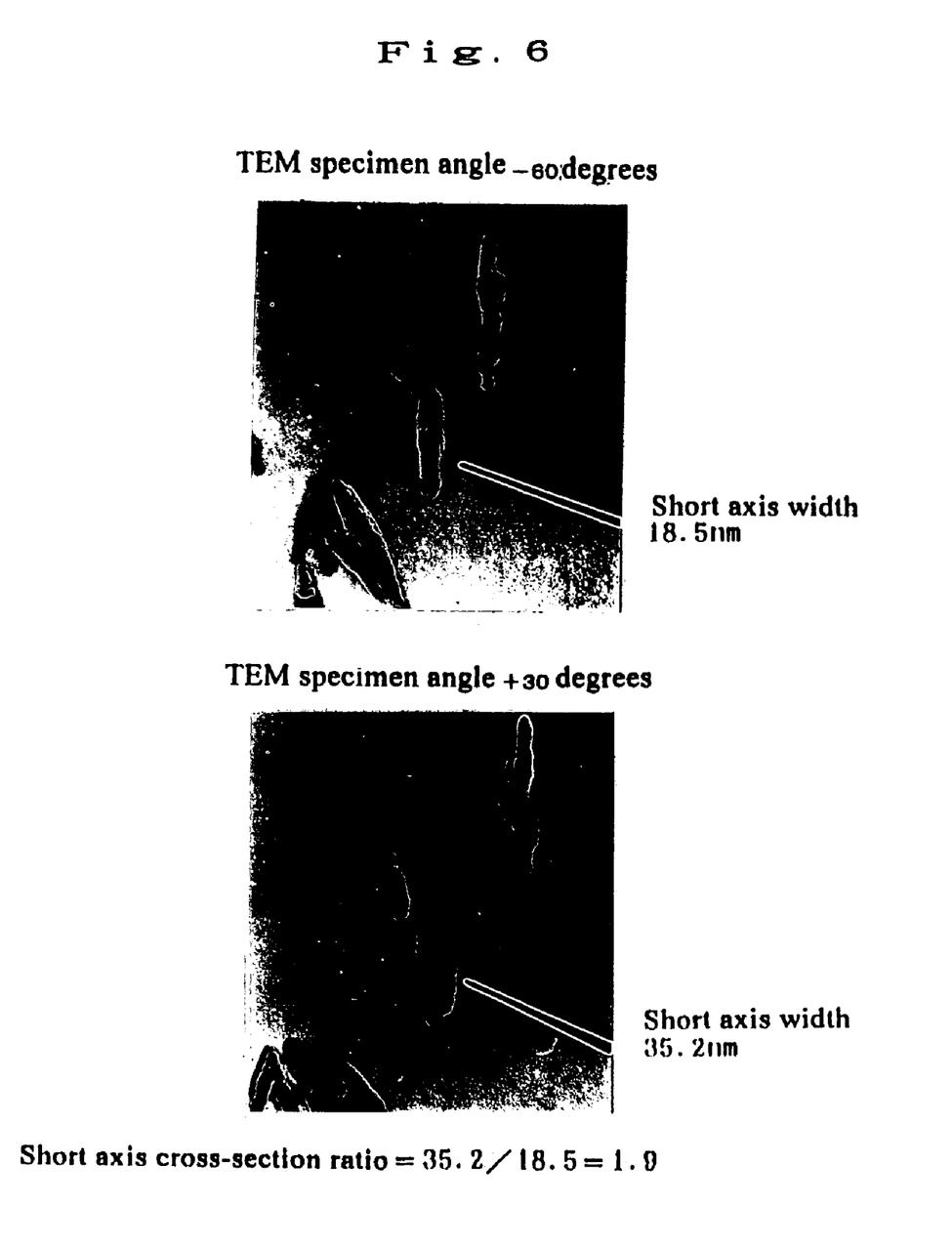
FIG. 6 is a set of electron micrographs (TEM images) of one of the underlayer powders obtained in Example 5 taken at different tilt angles of the specimen stage.

Short axis cross-section ratio: Value obtained by taking multiple electron micrographs of the same portion of a specimen while progressively tilting the specimen stage, measuring the maximum short width and maximum long width for 20 particles while noting the tilt angle, and dividing the average of the maximum long widths by the average of the maximum short widths. A set of electron micrographs (TEM images) of one of the underlayer powders obtained in Example 5 explained later is shown in FIG. 6 by way of reference. The upper TEM image in FIG. 6 was taken at a specimen stage tilt angle of −60 degrees and the lower TEM image was taken at a specimen stage tilt angle of +30 degrees. Focusing on a single particle (the particle near the middle indicated by the lead lines), the short axis widths of the particle viewed at the two angles (differing by 90 degrees) were measured to be 18.5 nm at the former angle and 35.2 nm at the latter angle. The short axis cross-section ratio of the particle therefore calculates to 35.2/18.5=1.9.

Specific surface area: Measured by the BET method.

Powder pH: Measured in accordance with JIS K5101.

Stearic acid adsorption amount: The powder specimen was dispersed in a 2% stearic acid solution (solvent: MEK), the solution was centrifuged, and adsorption amount per unit specific surface area was calculated from the concentration of the supernatant.

Resin adsorption amount (MR): Calculated the same way as stearic acid adsorption amount using a 1% vinyl chloride resin (MR110) solution (solvent: MEK and ketone).

Resin adsorption amount (UR): Calculated the same way as stearic acid adsorption amount using a 2% polyurethane resin (UR8200) solution (solvent: MEK, toluene and MIBK).

Coated film viscosity and tape evaluation was done using an underlayer tape fabricated under the following conditions using a paint prepared from the obtained iron oxide powder under the conditions set out below.

Paint Preparation Conditions
The constituents

| Iron oxide powder | 100 parts by weight |
| --- | --- |
| Vinyl chloride resin | 20 parts by weight |
| Methyl ethyl ketone | 165 parts by weight |
| Cyclohexanone | 65 parts by weight |
| Toluene | 165 parts by weight |
| Stearic acid | 1 part by weight |
| Acetylacetone | 1 part by weight. | were blended in the indicated number of parts by weight and the result was dispersed in a centrifugal ball mill for 1 hour to obtain a paint. Using an applicator, the paint was applied onto a base film made of polyethylene terephthalate to a target thickness of about 3 µm to form a nonmagnetic underlayer (underlayer tape).

Paint viscosity: The viscosity of the paint dispersion was measured using an R110 viscometer manufactured by Toki Sangyo Co., Ltd. of Japan.

Surface smoothness (surface roughness): Surface roughness (Ra) of the underlayer tape surface before calendering and surface roughness (Ra) of the underlayer tape surface after calendering were evaluated by measurement with an ET-30HK 3-D fine profilometer manufactured by Kosaka Laboratory Limited of Japan.

Calendering change rate: Calculated as 100× [(surface roughness before calendering-surface roughness after calendering)/(surface roughness before calendering)]. The magnetic layer formed on the underlayer calenders more readily with increasing calendering change rate. In other words, a larger calendering change rate enables formation of a smoother tape surface.

Surface smoothness (glossiness): The glossiness of the underlayer tape was measured at an angle of 60 degrees with a gloss meter.

Coated film strength (steel ball sliding): The coated surface of the underlayer tape was attached to a glass plate with the coated surface facing upward, the glass plate was placed on a horizontal surface, a 5-mm diameter stainless steel ball was placed on the coated surface of the tape, and a vertical load of 5 g was applied to the ball. In this condition, the glass plate was moved back and forth 20 mm in each direction 300 times at a constant horizontal velocity of 2,320 mm/min. After this operation, the width of the scratch left on the tape surface by the SUS steel ball was measured under an optical microscope. Further, the number of passes up to tape exfoliation was determined and defined as the number of sliding passes.

Running durability (steel ball sliding): The number of sliding passes up to detachment of the coated film was measured in the aforesaid steel ball sliding.

Example 1

A 0.5 mol aqueous solution of $Fe^{3+}$ was added under stirring at 10° C. with 1.2 equivalents based on $Fe^{3+}$ of an aqueous solution of sodium hydroxide to produce a ferric hydroxide precipitate. The suspension containing the precipitate was ripened for 10 hours at 45° C. to produce flat-acicular a-FeOOH. The suspension containing the flat-acicular a-FeOOH was added under stirring with an amount of an aqueous solution of sodium aluminate for obtaining 1.0 wt % of Al with respect a-FeOOH, the pH was adjusted to not greater than 9, and the flat-acicular a-FeOOH particles were subjected to Al coating treatment. Then, in the ordinary manner, the suspension was filtered and the filtrate washed with water, dried and fired at 650° C. to obtain flat-acicular iron oxide.

The composition of the obtained flat-acicular iron oxide powder determined by chemical analysis, the various properties of the powder determined as explained earlier, and the measured properties of an underlayer tape fabricated using the powder are set out in Table 1.

Example 2

A 0.5 mol aqueous solution of $Fe^{3+}$ was added under stirring at 10° C. with 1.2 equivalents based on $Fe^{3+}$ of an aqueous solution of sodium hydroxide to produce a ferric hydroxide precipitate. The suspension containing the precipitate was ripened for 10 hours at 45° C. to produce flat-acicular a-FeOOH. The suspension containing the flat-acicular a-FeOOH was added under stirring with an amount of an aqueous solution of phosphoric acid for obtaining 2.0 wt % of P with respect a-FeOOH and the flat-acicular a-FeOOH particles were subjected to P coating treatment. Then, in the ordinary manner, the suspension was filtered and the filtrate washed with water, dried and fired at 650° C. to obtain flat-acicular iron oxide. The properties of the obtained flat-acicular iron oxide powder were evaluated as described in Example 1. The results are shown in Table 1.

Example 3

Example 2 was repeated except that the suspension containing the ferric hydroxide precipitate was ripened at 50° C. The properties of the obtained flat-acicular iron oxide powder were evaluated as described in Example 1. The results are shown in Table 1.

Example 4

Example 2 was repeated except that the amount of sodium hydroxide added was 1.3 equivalents based on $Fe^{3+}$ and the suspension containing the ferric hydroxide precipitate was ripened at 50° C. The properties of the obtained flat-acicular iron oxide powder were evaluated as described in Example 1. The results are shown in Table 1.

Example 5

A 0.5 mol aqueous solution of $Fe^{3+}$ was added under stirring at 10° C. with 1.3 equivalents based on $Fe^{3+}$ of an aqueous solution of sodium hydroxide to produce a ferric hydroxide precipitate. The suspension containing the precipitate was ripened for 10 hours at 55° C. to produce flat-acicular a-FeOOH. The suspension containing the flat-acicular a-FeOOH was added under stirring with an amount of an aqueous solution of phosphoric acid for obtaining 2.0 wt % of P with respect a-FeOOH, the pH was adjusted to not greater than 9, and the flat-acicular a-FeOOH particles were subjected to P coating treatment. Next, an aqueous solution of yttrium was added in an amount such that the ratio of Y to Fe of a-FeOOH (Y/Fe) expressed in atomic percentage (at. %) was 1.0 at. %, the pH was adjusted to not greater than 9, and the flat-acicular a-FeOOH particles were subjected to Y coating treatment. Then, in the ordinary manner, the suspension was filtered and the filtrate washed with water, dried and fired at 650° C. to obtain flat-acicular iron oxide. The properties of the obtained flat-acicular iron oxide powder were evaluated as described in Example 1. The results are shown in Table 1.

Comparative Example 1

An aqueous solution containing 0.625 mol of $Na_2CO_3$ and an aqueous solution containing 0.45 mol of NaOH were mixed. The mixture was added with an aqueous solution containing 0.5 mol of $Fe^{2+}$ and ripened for 90 minutes at 45° C. Air was then passed through mixture at 45° C. to obtain a-FeOOH (short axis cross-section ratio of approximately 1). The suspension containing this a-FeOOH was added with an amount of an aqueous solution of sodium aluminate for obtaining 1.0 wt % of Al with respect a-FeOOH, the pH was adjusted to not greater than 9, and the a-FeOOH particles were subjected to Al coating treatment. Then, in the ordinary manner, the suspension was filtered and the filtrate washed with water, dried and fired at 650° C. to obtain acicular iron oxide (but with a short axis cross-section ratio of approximately 1). The properties of the obtained iron oxide powder were evaluated as described in Example 1. The results are shown in Table 1.

(short axis cross-section ratio=1), a smooth coated film of low surface roughness was prepared in Example 1 in which the short axis cross-section ratio was larger. In addition, the tape durability also improved, as evidenced by the small scratch width and large number of sliding passes. It is considered that a smoother surface was obtained with the flat-acicular iron oxide powder having a large short axis cross-section ratio because at the time of preparing and applying the paint the particles could readily overlap to form a large surface. Further, the flat-acicular particles are thought to have enhanced tape strength on top of improving surface smoothness because the number of particles oriented perpendicularly to the support surface was small and the particles were densely oriented in the direction of the tape surface.

(2) The coated film prepared using the flat-acicular iron oxide powder of Example 1 experienced a larger change in surface roughness between before and after calendering than did the one of Comparative Example 1. Therefore, when the underlayer was calendered at the time of forming the magnetic layer thereon as an upper layer, the underlayer was readily submissive to the calendering. In other words, a

TABLE 1

| | Short axis cross-section ratio, type of coating element and type and amount of flat-acicular iron hydroxide | | | | | | | | | Powder properties | | | | | |
|---|---|---|---|---|---|---|---|---|---|---|---|---|---|---|---|
| | Short axis cross-section ratio | Al wt % | P | Y | Firing Temp ° C. | Al | Main constituents in iron oxide P wt % | Y | Na | Ave. major axis length nm | Ave. minor axis length nm | Ave. axial ratio | Short axis cross-section ratio | Spec. surface area (BET) m²/g | Powder pH |
| Comp. Exmp. 1 | 1.00 | 1 | — | — | 650 | 0.95 | — | — | 0.011 | 88 | 16 | 5.5 | 1.00 | 53 | 8.7 |
| Exmp. 1 | 1.55 | 1 | — | — | 650 | 0.95 | — | — | 0.010 | 92 | 16 | 5.8 | 1.45 | 55 | 9.0 |
| Exmp. 2 | 1.65 | — | 2 | — | 650 | — | 1.4 | — | 0.011 | 93 | 15 | 6.2 | 1.55 | 57 | 5.6 |
| Exmp. 3 | 1.75 | — | 2 | — | 650 | — | 1.4 | — | 0.012 | 112 | 16 | 7.0 | 1.65 | 59 | 5.2 |
| Exmp. 4 | 2.00 | — | 2 | — | 650 | — | 1.4 | — | 0.011 | 105 | 18 | 5.8 | 1.80 | 61 | 5.5 |
| Exmp. 5 | 2.00 | — | 2 | 1 | 650 | — | 1.3 | 1.1 | 0.010 | 110 | 18 | 6.1 | 1.90 | 62 | 5.5 |

| | Powder properties Adsorption properties | | | Paint viscosity | Tape evaluation Surface roughness before and after calendering and before-after change rate | | | Tape durability Steel ball sliding | |
|---|---|---|---|---|---|---|---|---|---|
| | Stearic acid adsorption amount mg/m² | MR adsorption amount mg/m² | UR Adsorption amount mg/m² | Viscosity Paint mPa·s | Before Calendaring Å | After Calendaring Å | Change Rate % | Scratch width μm | No. Of Passes Times |
| Comp. Exmp. 1 | 1.8 | 0.9 | 2.3 | 190 | 380 | 250 | 42 | 270 | 430 |
| Exmp. 1 | 1.9 | 0.9 | 2.3 | 210 | 330 | 133 | 60 | 230 | 660 |
| Exmp. 2 | 0.8 | 1.0 | 2.3 | 230 | 285 | 115 | 60 | 180 | 910 |
| Exmp. 3 | 0.9 | 1.0 | 2.3 | 240 | 255 | 90 | 65 | 170 | 990 |
| Exmp. 4 | 0.9 | 1.0 | 2.2 | 320 | 220 | 60 | 73 | 130 | 1130 |
| Exmp. 5 | 0.9 | 1.0 | 2.3 | 360 | 160 | 40 | 75 | 120 | 1230 |

The following conclusions can be drawn from Table 1.

(1) As can be seen from a comparison of Example 1 (short axis cross-section ratio=1.45) and Comparative Example 1 smoother coated film could be formed that was ideal as the underlayer of a multi-layer structure magnetic recording medium.

(3) The coated film prepared using P-containing flat-acicular iron oxide powder of Example 2 was even better in surface smoothness than that of Example 1 containing no P. Owing to the P content, moreover, the powder pH was 4.6, so that the fatty acid adsorption amount (StA.) was low. The lubricant (fatty acid) constituting a component of the coated film was therefore not prevented from playing its intended role and this is thought to be why the durability was improved over that in Example 1.

(4) In Examples 2–4, the short axis cross-section ratio was changed by changing the iron oxy-hydroxide production conditions. It can be seen that both the surface smoothness and the tape durability improve with increasing short axis cross-section ratio of the flat-acicular iron oxide.

(5) The flat-acicular iron oxide (hematite) of Example 5, which contained Y in addition to P, had a still larger short axis cross-section ratio, as can be seen from a comparison with that of Example 4, for example. This resulted in further improvements in surface smoothness and tape durability. From this it follows that for maximizing contribution to tape surface smoothness and tape durability, the flat-acicular iron oxide (hematite) should preferably contain P or both P and R (defined as including Y).

Example 6

In this Example, a multi-layer structure magnetic tape fabricated to have a nonmagnetic layer formed using the underlayer powder obtained in Example 5 and a magnetic layer formed using the metal magnetic powder set out below was evaluated for electromagnetic conversion characteristics and tape durability.

The nonmagnetic powder paint was prepared by blending 85 parts by weight of the underlayer powder obtained in Example 5 with the components set out below in the indicated number of parts by weight, followed by kneading and dispersing using a kneader and a sand grinder.

Nonmagnetic Paint Composition

| | |
|---|---|
| Underlayer powder of Example 5 ($\alpha$-Fe$_2$O$_3$) | 85 parts by weight |
| Carbon black | 20 parts by weight |
| Alumina | 3 parts by weight |
| Vinyl chloride resin (MR110) | 15 parts by weight |
| Polyurethane resin (UR8200) | 15 parts by weight |
| Methyl ethyl ketone | 190 parts by weight |
| Cyclohexanone | 80 parts by weight |
| Toluene | 110 parts by weight |

The magnetic powder paint was prepared by blending 100 parts by weight of the metal magnetic powder set out below with the components set out below in the indicated number of parts by weight, followed by kneading and dispersing using a kneader and a sand grinder.

Metal Magnetic Powder

Major axis length: 80 nm

BET: 61 m$^2$/g

Dx: 150 Angstrom

Hc: 2,400 (Oe)

ss: 127 emu/g

Magnetic Paint Composition

| | |
|---|---|
| Metal magnetic powder shown above: | 100 parts by weight |
| Carbon black | 5 parts by weight |
| Alumina | 3 parts by weight |
| Vinyl chloride resin (MR110) | 15 parts by weight |
| Polyurethane resin (UR8200) | 15 parts by weight |
| Stearic acid | 1 part by weight |
| Acetylacetone | 1 part by weight |
| Methyl ethyl ketone | 190 parts by weight |
| Cyclohexanone | 80 parts by weight |
| Toluene | 110 parts by weight |

These paints were applied onto a base film composed of an aramid support to obtain a nonmagnetic layer (underlayer) thickness of 2.0 μm and a magnetic layer thickness of 2.0 μm. The magnetic layer was oriented while still damp by exposure to a magnetic field, whereafter drying and calendering were conducted to obtain a magnetic tape.

The obtained magnetic tape was tested for surface smoothness (roughness) and tape durability (number of steel ball sliding passes) by the methods explained above. The magnetic conversion properties (C/N and output) of the tape were also measured. In C/N ratio measurement, a recording head was attached to a drum tester and a digital signal was recorded at a recording wavelength of 0.35 μm. At this time, an MR head was used to measure the reproduced signal and noise was measured as modulation noise. In evaluation, the output when using the iron oxide powder of Comparative Example 2 was defined as 0 dB and the measured values represented relative to this value. The results are shown in Table 2.

Example 7

Example 6 was repeated except that the underlayer powder obtained in Example 1 was used as the underlayer powder. The surface smoothness (roughness), tape durability (number of steel ball sliding passes) and electromagnetic conversion characteristics of the obtained magnetic tape are shown in Table 2.

Comparative Example 2

Example 6 was repeated except that the iron oxide powder obtained in Comparative Example 1 was used as the underlayer powder. The surface smoothness (roughness), tape durability (number of steel ball sliding passes) and electromagnetic conversion characteristics of the obtained magnetic tape are shown in Table 2.

TABLE 2

| Multi-layer structure magnetic tape | Underlayer powder used | Surface smoothness Roughness (Å) | Electromagnetic conversion characteristics Output | C/N | Tape durability Steel ball sliding passes |
|---|---|---|---|---|---|
| Example 6 | Example 5 | 95 | +1.5 dB | +3.5 dB | 1,320 times |
| Example 7 | Example 1 | 190 | +0.7 dB | +1.7 dB | 960 times |
| Comparative Example 2 | Comparative Example 1 | 360 | 0 dB | 0 dB | 640 times |

The following conclusions can drawn from Table 2.

As can be seen from a comparison of Examples 6 and 7 with Comparative Example 2, a multi-layer structure magnetic tape manufactured using an underlayer powder according to the present invention exhibited excellent surface smoothness and, as a result, high output and high C/N that made it suitable for use as a high-density recording medium. The magnetic tape was also excellent in durability and in durability against sliding relative to a head.

As can be seen from a comparison of Example 6 and Example 7, the flat-acicular underlayer powder containing P and Y and having a high section ratio (powder of Example 5) exhibited still better tape surface smoothness in a multi-layer structure and, as a result, even higher output and high C/N along with excellent durability.

Example 8

Example 2 was repeated except that the suspension containing the ferric hydroxide precipitate was ripened at 35° C. The properties of the obtained flat-acicular iron oxide powder were evaluated as described in Example 1. The results are shown in Table 3.

Example 9

Example 2 was repeated except that the suspension containing the ferric hydroxide precipitate was ripened at 70° C. The properties of the obtained flat-acicular iron oxide powder were evaluated as described in Example 1. The results are shown in Table 3.

Comparative Example 3

Example 2 was repeated except that the suspension containing the ferric hydroxide precipitate was ripened at 25° C. The properties of the obtained flat-acicular iron oxide powder were evaluated as described in Example 1. The results are shown in Table 3.

Comparative Example 4

Example 2 was repeated except that the suspension containing the ferric hydroxide precipitate was ripened at 80 C. The properties of the obtained flat-acicular iron oxide powder were evaluated as described in Example 1. The results are shown in Table 3.

Example 10

Example 2 was repeated except that no aqueous solution of yttrium was added following the P coating treatment of the flat-acicular a-FeOOH. The properties of the obtained flat-acicular iron oxide powder were evaluated as described in Example 1. The results are shown in Table 3.

Example 11

Example 2 was repeated except that the P coating treatment of the flat-acicular a-FeOOH was followed by addition of an aqueous solution of yttrium in an amount to make the atomic percentage of Y relative to Fe (Y/Fe) 0.18 at. %. The properties of the obtained flat-acicular iron oxide powder were evaluated as described in Example 1. The results are shown in Table 3.

Example 12

Example 2 was repeated except that the P coating treatment of the flat-acicular a-FeOOH was followed by addition of an aqueous solution of yttrium in an amount to make the atomic percentage of Y relative to Fe (Y/Fe) 8.18 att. %. The properties of the obtained flat-acicular iron oxide powder were evaluated as described in Example 1. The results are shown in Table 3.

Comparative Example 5

Example 2 was repeated except that the P coating treatment of the flat-acicular a-FeOOH was followed by addition of an aqueous solution of yttrium in an amount to make the atomic percentage of Y relative to Fe (Y/Fe) 14.54 at. %. The properties of the obtained flat-acicular iron oxide powder were evaluated as described in Example 1. The results are shown in Table 3.

Example 13

Example 2 was repeated except that the suspension containing the produced flat-acicular a-FeOOH was added under stirring with an aqueous solution of phosphoric acid in an amount to make the content of P relative to a-FeOOH 0.28 wt %. The properties of the obtained flat-acicular iron oxide powder were evaluated as described in Example 1. The results are shown in Table 3.

Example 14

Example 2 was repeated except that the suspension containing the produced flat-acicular a-FeOOH was added under stirring with an aqueous solution of phosphoric acid in an amount to make the content of P relative to a-FeOOH 6.43 wt %. The properties of the obtained flat-acicular iron oxide powder were evaluated as described in Example 1. The results are shown in Table 3.

Comparative Example 6

Example 2 was repeated except that the suspension containing the produced flat-acicular a-FeOOH was added under stirring with an aqueous solution of phosphoric acid in an amount to make the content of P relative to a-FeOOH 7.86 wt %. The properties of the obtained flat-acicular iron oxide powder were evaluated as described in Example 1. The results are shown in Table 3.

order of Comparative Example 3, Example 8, Example 5, Example 9 and Comparative Example 4, there was also an accompanying change in the axial ratio, but that in the case of the very small particle diameter of Comparative Example 3 (major axis length=15 nm) tape making became impossible owing to the difficulty of dispersion into the resin. On the other hand, in the case of the large particle diameter of Comparative Example 4 (major axis length=250 nm), the axial ratio and short axis cross-section ratio were large but

TABLE 3

| | Short axis cross-section ratio, type of coating element and type and amount of flat-acicular iron hydroxide | | | | Powder properties | | | | | | | | | |
|---|---|---|---|---|---|---|---|---|---|---|---|---|---|---|
| | Short axis cross-section ratio | Al wt % | P | Y | Firing Temp °C. | Main constituents in iron oxide | | | | Ave. major axis length Nm | Ave. minor axis length nm | Ave. axial ratio | Short axis cross-section ratio | Spec. surface area (BET) m²/g | Powder pH |
| | | | | | | Al | P | Y Wt % | Na | | | | | | |
| Exmp. 8 | 1.60 | — | 2.0 | 1.0 | 650 | — | 1.3 | 1.1 | 0.011 | 25 | 9 | 2.8 | 1.30 | 95 | 5.4 |
| Exmp. 9 | 2.10 | — | 2.0 | 1.0 | 650 | — | 1.3 | 1.1 | 0.010 | 190 | 28 | 6.8 | 1.95 | 41 | 5.5 |
| Exmp. 10 | 1.80 | — | 2.0 | — | 650 | — | 1.3 | — | 0.011 | 100 | 20 | 5.0 | 1.70 | 53 | 5.4 |
| Exmp. 11 | 2.05 | — | 2.0 | 0.2 | 650 | — | 1.3 | 0.2 | 0.011 | 105 | 19 | 5.5 | 1.90 | 58 | 5.3 |
| Exmp. 12 | 2.00 | — | 2.0 | 8.2 | 650 | — | 1.3 | 9.0 | 0.011 | 110 | 18 | 6.1 | 1.90 | 82 | 5.5 |
| Exmp. 13 | 1.90 | — | 0.3 | 1.0 | 650 | — | 0.2 | 1.1 | 0.011 | 105 | 20 | 5.3 | 1.80 | 53 | 6.9 |
| Exmp. 14 | 2.10 | — | 7.0 | 1.0 | 650 | — | 4.5 | 1.1 | 0.011 | 110 | 18 | 6.1 | 1.90 | 92 | 3.2 |
| Comp. Exmp. 3 | 1.45 | — | 2.0 | 1.0 | 650 | — | 1.3 | 1.1 | 0.011 | 15 | 6 | 2.5 | 1.20 | 112 | 5.5 |
| Comp. Exmp. 4 | 2.30 | — | 2.0 | 1.0 | 650 | — | 1.3 | 1.1 | 0.011 | 250 | 33 | 7.6 | 2.10 | 29 | 5.3 |
| Comp. Exmp. 5 | 2.05 | — | 2.0 | 14.0 | 650 | — | 1.3 | 15.0 | 0.011 | 110 | 18 | 6.1 | 1.90 | 93 | 5.5 |
| Comp. Exmp. 6 | 2.05 | — | 8.6 | 1.0 | 650 | — | 5.5 | 1.1 | 0.011 | 110 | 18 | 6.1 | 1.90 | 102 | 2.6 |

| | Powder properties Adsorption properties | | | Tape evaluation | | | | Tape durability Steel ball sliding | |
|---|---|---|---|---|---|---|---|---|---|
| | Stearic acid adsorption amount mg/m² | MR adsorption amount mg/m² | UR adsorption amount mg/m² | Paint Viscosity mPa·s | Surface roughness | | | Scratch width μm | No. of passes Times |
| | | | | | Before Calendering Å | After Calendering Å | Change Rate % | | |
| Exmp. 8 | 0.7 | 1.0 | 2.1 | 730 | 340 | 145 | 57 | 130 | 1190 |
| Exmp. 9 | 0.9 | 1.0 | 2.3 | 200 | 290 | 140 | 52 | 120 | 1250 |
| Exmp. 10 | 0.9 | 1.0 | 2.3 | 280 | 230 | 70 | 70 | 135 | 1100 |
| Exmp. 11 | 0.9 | 1.0 | 2.3 | 340 | 180 | 60 | 67 | 125 | 1280 |
| Exmp. 12 | 0.7 | 1.0 | 2.3 | 670 | 220 | 120 | 45 | 125 | 1210 |
| Exmp. 13 | 1.1 | 1.0 | 2.3 | 280 | 140 | 55 | 61 | 160 | 900 |
| Exmp. 14 | 0.7 | 1.0 | 2.3 | 740 | 170 | 80 | 53 | 125 | 1240 |
| Comp. Exmp. 3 | 0.7 | 1.0 | 2.1 | 930 | Tape making impossible owing to nondispersibility | | | | |
| Comp. Exmp. 4 | 0.9 | 1.0 | 2.3 | 160 | 390 | 225 | 42 | 115 | 1260 |
| Comp. Exmp. 5 | 0.7 | 1.0 | 2.3 | 840 | 350 | 220 | 37 | 130 | 1250 |
| Comp. Exmp. 6 | 0.7 | 1.0 | 2.3 | 920 | 360 | 210 | 42 | 120 | 1250 |

The following conclusions can be drawn from Table 3 (also see Table 1).

(1) Looking at the influence of the particle size (average major axis length) of the iron oxide (hematite), it is found, for example, that as the particle diameter increased in the surface smoothness was poor. It can therefore be seen that a particle diameter (average major axis length) in the range of 20 nm–200 nm is preferable.

(2) Looking at the influence of the yttrium content of the iron oxide (hematite), it is found, for example, that yttrium content increased in the order of Example 10, Example 11, Example 5 and Comparative Example 5, but that in the case of Comparative Example 5, which contained more yttrium than needed, the specific surface area became large, so that dispersion into the resin was degraded and the surface smoothness became inferior as a result. Thus, also regarding yttrium content, it can be seen that there is an appropriate range for maintaining good surface smoothness (Y/Fe expressed in atomic percentage of 0.1–10 at. %).

(3) Looking at the influence of the phosphorus content of the iron oxide (hematite), it is found, for example, that phosphorus content increased in the order of Example 13, Example 5, Example 14 and Comparative Example 6, but that in the case of Comparative Example 6, whose phosphorus content was too high, the paint viscosity increased to degrade dispersibility and the surface smoothness was inferior as a result. On the other hand, the stearic acid adsorption amount increased with decreasing phosphorus content, causing the lubricant effect to decline and the scratch width factor of tape durability increase. Thus, while phosphorus operates effectively to improve tape durability, it degrades surface smoothness when present in excess, so that it can be seen that there is a preferable range of phosphorus content (0.1–5.0 wt %).

As explained in the foregoing, the present invention provides an iron oxide powder that enhances the properties required of a powder for forming the underlayer of a multi-layer structure coating-type magnetic recording medium, most notably the surface smoothness and strength of the tape. Use of the flat-acicular iron oxide powder of the present invention as a powder for forming the underlayer of a multi-layer structure coating-type magnetic recording medium therefore makes it possible to obtain a durable recording medium suitable for high-density recording.

What is claimed is:

1. A powder for an underlayer of a coating-type magnetic recording medium, which powder comprises flat-acicular iron oxide particles having an average major axis length of 20–200 nm, a short axis cross-section taken perpendicularly to the long axis that has a long width and a short width, and a short axis cross-section ratio defined as the ratio of the long width to the short width that is greater than 1.3 and substantially uniform in the long axis direction, the powder containing 0.1–5.0 wt % of P, and an amount of R (where R represents one or more rare earth elements, defined as including Y) such that R/Fe expressed in atomic percentage (at.%) is 0.1–10 at.%, and having a specific surface area measured by the BET method of 30–100 $m^2$/g.

2. A powder for an underlayer of a coating-type magnetic recording medium according to claim 1, whose powder pH is not greater than 7.

3. A coating-type magnetic recording medium constituted as a multi-layer structure coating-type magnetic recording medium consisting of a magnetic layer composed of magnetic powder dispersed in resin, a base film, and a nonmagnetic layer (underlayer) composed of nonmagnetic powder dispersed in a resin that is located between the magnetic layer and the base film, wherein the nonmagnetic powder is a powder for an underlayer defined in claim 2.

4. A coating-type magnetic recording medium constituted as a multi-layer structure coating-type magnetic recording medium consisting of a magnetic layer composed of magnetic powder dispersed in resin, a base film, and a nonmagnetic layer (underlayer) composed of nonmagnetic powder dispersed in a resin that is located between the magnetic layer and the base film, wherein the nonmagnetic powder is a powder for an underlayer defined in claim 1.

5. The powder of claim 1, wherein the flat acicular iron oxide particles are nonmagnetic.

* * * * *